(12) United States Patent
Lomer

(10) Patent No.: US 11,535,200 B2
(45) Date of Patent: Dec. 27, 2022

(54) VEHICLE SURFACE CLEANING DEVICE

(71) Applicant: KAUTEX TEXTRON GMBH & CO. KG, Bonn (DE)

(72) Inventor: Alexander Lomer, Cardiff (GB)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 120 days.

(21) Appl. No.: 16/486,624

(22) PCT Filed: Jan. 23, 2018

(86) PCT No.: PCT/EP2018/051498
§ 371 (c)(1),
(2) Date: Aug. 16, 2019

(87) PCT Pub. No.: WO2018/149591
PCT Pub. Date: Aug. 23, 2018

(65) Prior Publication Data
US 2020/0001833 A1   Jan. 2, 2020

(30) Foreign Application Priority Data
Feb. 16, 2017  (DE) ................ 10 2017 103 158.8

(51) Int. Cl.
*B60S 1/52*  (2006.01)
*B60S 1/02*  (2006.01)
*B60S 1/48*  (2006.01)

(52) U.S. Cl.
CPC ................ *B60S 1/52* (2013.01); *B60S 1/026* (2013.01); *B60S 1/487* (2013.01); *B60S 1/488* (2013.01); *B60S 1/528* (2013.01)

(58) Field of Classification Search
CPC ........ B60S 1/023; B60S 1/026; B60S 1/0487; B60S 1/0488; B60S 1/50; B60S 1/52; B05B 1/10; B05B 15/50
See application file for complete search history.

(56) References Cited

U.S. PATENT DOCUMENTS 3,144,174 A * 8/1964 Abplanalp ............. B65D 83/72
                                                     222/146.2
4,088,269 A * 5/1978 Schlick .................... B05B 1/24
                                                         137/341

(Continued)

FOREIGN PATENT DOCUMENTS

CN    201712119 U  *  1/2011
DE    7415380       11/1975

(Continued)

OTHER PUBLICATIONS

International Search Report, dated May 7, 2018, received in corresponding PCT Application No. PCT/EP2018/051498.

(Continued)

*Primary Examiner* — Jason J Boeckmann
(74) *Attorney, Agent, or Firm* — Grossman, Tucker, Perreault & Pfleger, PLLC

(57) ABSTRACT

A vehicle surface cleaning device comprising a vehicle integrated housing including a nozzle carrier extendable from and retractable into the bodywork of a vehicle, said nozzle carrier being provided with at least one fluid nozzle, and comprising means for contactlessly heating the fluid nozzle while being in a retracted position.

14 Claims, 5 Drawing Sheets

(56) References Cited

U.S. PATENT DOCUMENTS

| | | | |
|---|---|---|---|
| 6,186,156 B1 | 2/2001 | Schlein | |
| 6,220,524 B1 * | 4/2001 | Tores | B05B 1/24 |
| | | | 239/130 |
| 6,501,907 B1 * | 12/2002 | Rehs | B60S 1/52 |
| | | | 239/133 |
| 6,615,438 B1 * | 9/2003 | Franco | B60S 1/488 |
| | | | 239/128 |
| 2005/0235979 A1 * | 10/2005 | Whittaker | F28D 7/0016 |
| | | | 126/19.5 |
| 2008/0034528 A1 | 2/2008 | Bourke et al. | |

FOREIGN PATENT DOCUMENTS

| | | |
|---|---|---|
| DE | 3311266 | 10/1984 |
| DE | 19902432 | 8/2000 |
| DE | 10048014 | 4/2002 |
| JP | S60-67212 | 4/1985 |

OTHER PUBLICATIONS

Written Opinion, dated May 7, 2018, received in corresponding PCT Application No. PCT/EP2018/051498.
International Preliminary Report on Patentability, dated Apr. 11, 2019, received in corresponding PCT Application No. PCT/EP2018/051498.
First Office Action from related Chinese Appln. No. 201880012428.4, dated Apr. 15, 2022. English translation attached.
Second Office Action from related Chinese Appln. No. 201880012428.4, dated Oct. 20, 2022. English translation attached.
"Encyclopedia of China Household Appliance", Mar. 31, 1991. No English translation available, however, concise explanation of relevancy can be found in the English translatio of the Chinese Office Action submitted herewith.

\* cited by examiner

VEHICLE SURFACE CLEANING DEVICE

FIELD

The invention refers to a vehicle surface cleaning device comprising a vehicle integrated housing including a nozzle carrier, said nozzle carrier being provided with at least one fluid nozzle.

The invention particularly refers to a vehicle surface cleaning device including a nozzle carrier extendable from and retractable into the bodywork of the vehicle.

BACKGROUND

Such types of vehicle surface cleaning devices are generally known in the art. Sometimes these cleaning devices are also referred to as so-called pop-up or telescopic washing nozzles, which are normally integrated in the front or rear bumpers or in the hatch of a passenger car. Telescopic nozzles are mostly utilized for cleaning headlamps or rear windows or camera lenses of passenger cars.

Windscreen cleaning is normally performed via static nozzles attached to the bonnet of the car.

Under freezing conditions, that is to say if the outside air temperature is below 0° C., washing fluid tends to freeze. As normally washing fluid contains additives like alcohol, the freezing point is normally remarkably below 0° C. Generally, heated static fluid nozzles are known in the art. A heated nozzle is for example disclosed in DE 199 024 32 A1. This reference discloses a nozzle arrangement comprising a nozzle with a washing liquid channel and a heating element and a connecting part with at least one connector for a hose and one for the nozzle. The connecting part is designed to accommodate at least two electrical leads and means for contacting the leads with the heating element are arranged in the connecting part and in the heated nozzle so that the nozzle is connected mechanically and electrically to the connecting part when fitted into it.

An electrical element integrated into the nozzle close to the aperture of the nozzle, for example a PTC resistor, might be appropriate for static nozzles but is less suitable for dynamic ones such as the so-called pop-up nozzles. That is mainly because such a design would require exposed electrical contacts or sliding electrical connections, which would be subject to corrosion.

Electrical elements which require wiring are also not suitable for cleaning units which are movable relative to the bodywork of the vehicle because the electrical wiring would be subject to frequent bending. A person skilled in in the art will appreciate that frequently bent wires tend to break due to fatigue.

SUMMARY

It is therefore an object of the current invention to provide a vehicle surface cleaning device of the above referred kind which can easily and effectively be heated. It is also an object of the current invention to provide a method for effectively defrosting a fluid nozzle of a vehicle surface cleaning device.

The invention also provides a method for defrosting fluid nozzles of vehicle surface cleaning devices. A vehicle surface in the sense of this application may be any exposed surface of the vehicle onto which a cleaning fluid is to be propelled. That might be a windscreen, the exposed surface of a sensor, a camera lens, a headlamp screen, a rearview mirror or the like.

A cleaning fluid in the sense of the current patent application may be a liquid and/or gas. More specifically a cleaning fluid according to the current patent application may be water, an aqueous solution or for example air. A cleaning fluid in the sense of the current patent application may also be a mixture of water and air or a mixture of a liquid cleaning fluid and air. An aqueous solution in the sense of the current patent application might be for example water including additives such as alcohols or surfactants.

The bodywork of the vehicle in the sense of the current application also includes covering, cladding and lining parts as well as for example plastic bumpers.

Hereinafter the terms nozzle and fluid nozzle are used synonymously.

The concept of the current invention is to wirelessly i.e. contactlessly heat the fluid nozzle. That may be accomplished for example by heating the nozzle via heat radiation. The nozzle may be for example made from a material with relatively large heat capacity and/or with enhanced heat conductivity. For example, in a retracted position the nozzle may be heated with an infrared heat source integrated into the bodywork of the vehicle or integrated into a nozzle housing.

The invention is most appropriate when used to wirelessly heat a telescopic nozzle but may also be used to heat a static nozzle with no moving parts. The advantages of wirelessly heating the nozzle also apply to such static nozzles which are for example mounted on movable parts of the bodywork of the vehicle so that wires would be subject to frequent bending which leads to material fatigue.

In a preferred embodiment of the vehicle surface cleaning device according to the current invention the at least one fluid nozzle has a nozzle body comprising electrically conductive material, in particular ferrous metal, in contact with the nozzle body or integrated into the nozzle body. Positioned in close proximity to the at least one fluid nozzle, there is provided at least one electrical coil which may be selectively energized, preferably, the electrical cord completely surrounds the nozzle when the nozzle is in a retracted position.

The invention preferably uses the concept of induction heating to defrost the nozzle. The electrical coil functions as an induction heater. For that purpose, the coil is preferably connected to an AC power supply to generate a constantly changing magnetic field.

In one advantageous embodiment of the vehicle surface cleaning device according to the current invention the nozzle body comprises thermoplastic material, which is filled with electrically conductive particles, in particular with ferrous particles. The nozzle body may for example be produced by injection molding of filled thermoplastic material.

Alternatively, the nozzle body includes a heating element made off an electrically conductive material, preferably a steel heating element, overmolded or embedded in a potting compound and extending in the vicinity of a nozzle aperture. The alternating magnetic field of the electrical coil will induce an electrical current in the heating element and thus the heating element will heat up inductively.

In one advantageous embodiment the heating element may be in the form of a metal, preferably a steel strip extending in parallel to a nozzle channel leading into the nozzle aperture.

The potting compound may comprise epoxy resin.

In one other alternative embodiment the heating element has been obtained by overmolding during production of the nozzle body.

Preferably, the nozzle carrier comprises a nozzle carrier housing connectable to a cleaning fluid source.

The nozzle carrier as well as the nozzle body can comprise electrically conductive material. For example, the nozzle carrier and the nozzle body may be monolithic, for example made from thermoplastic material filled with electrically conductive particles. Alternatively, the nozzle carrier and the nozzle body may be made from conductive material such as ferrous metal.

Generally, the concept according to the invention applies to static nozzles as well as to so-called pop-up nozzles as well.

In a preferred embodiment of the vehicle surface cleaning device according to the invention the nozzle carrier is extendable from and retractable into the bodywork of a vehicle.

Preferably the vehicle surface cleaning device according to the invention is designed such that contactlessly heating the fluid nozzle can be performed each time the nozzle carrier is in the retracted position within the bodywork of the vehicle.

The nozzle carrier may comprise at least one extendable and retractable piston which is slidably arranged within the nozzle carrier housing and which is extendable by virtue of the pressure of the cleaning fluid.

The electrical coil is preferably positioned around the nozzle body when the nozzle body is in the retracted position. The electrical coil may be integrated into or wound around the nozzle carrier housing.

Alternatively, the electrical coil may be arranged in the bodywork of the vehicle, for example in the bumper or other cladding part into which the nozzle carrier may be retracted and in which the vehicle surface cleaning device is preferably mounted in a concealed fashion.

In another alternative embodiment the electrical coil may be arranged in or at a support for the nozzle carrier housing or in a casing for the cleaning device.

The electrical coil could for example be a spring element or other metal part anyway required.

Preferably, the vehicle surface cleaning device according to the current invention comprises a casing to be mounted in the vehicle bodywork, a cleaning fluid source, a cleaning fluid pump and a cleaning fluid circuit or a cleaning fluid conduit.

The invention also refers to a method for defrosting a fluid nozzle of a vehicle surface cleaning device, comprising:
providing a nozzle with a nozzle body comprising electrically and/or thermally conductive material,
providing an electrical coil or an infrared heating source and arranging the electrical coil or the infrared heating source in the vicinity of the nozzle body or a nozzle carrier so that upon energization of the electrical coil or upon actuation of the infrared heating source the electrically and or thermally conductive material will be heated and
selectively energizing the coil with alternating current or selectively energizing the infrared heating source.

Arranging the coil or the infrared heating source in close proximity to the nozzle body or to the nozzle carrier in the sense of the current application is to be understood that either the heating source or the coil can be brought in close proximity to the nozzle body or to the nozzle carrier or that the nozzle carrier or the nozzle can be brought in close proximity to a coil or the infrared heating source.

Generally, the nozzle body and/or the nozzle carrier can be manufactured from electrically or thermally conductive material or from a thermoplastic material including electrically or thermally conductive material either in the form of dispersed particles, that is to say filled with such particles, or in the form of at least one electrically conductive element integrated into the thermoplastic material, that is to say either overmolded or embedded in a potting compound.

The electrical coil or the infrared heating source may for example be energized upon to ignition of the vehicle, if the outside temperature falls below a given threshold.

Preferably, the electrical coil or the infrared heating source is being energized for a given time span after the ignition has been actuated.

Preferably, the method comprises utilization of a vehicle surface cleaning device of the above referred kind with one or more of the above described features.

BRIEF DESCRIPTION OF THE DRAWINGS

Advantageous embodiments of the invention are hereinafter described by way of example with reference to the accompanying drawings in which.

DETAILED DESCRIPTION

Figure 1:
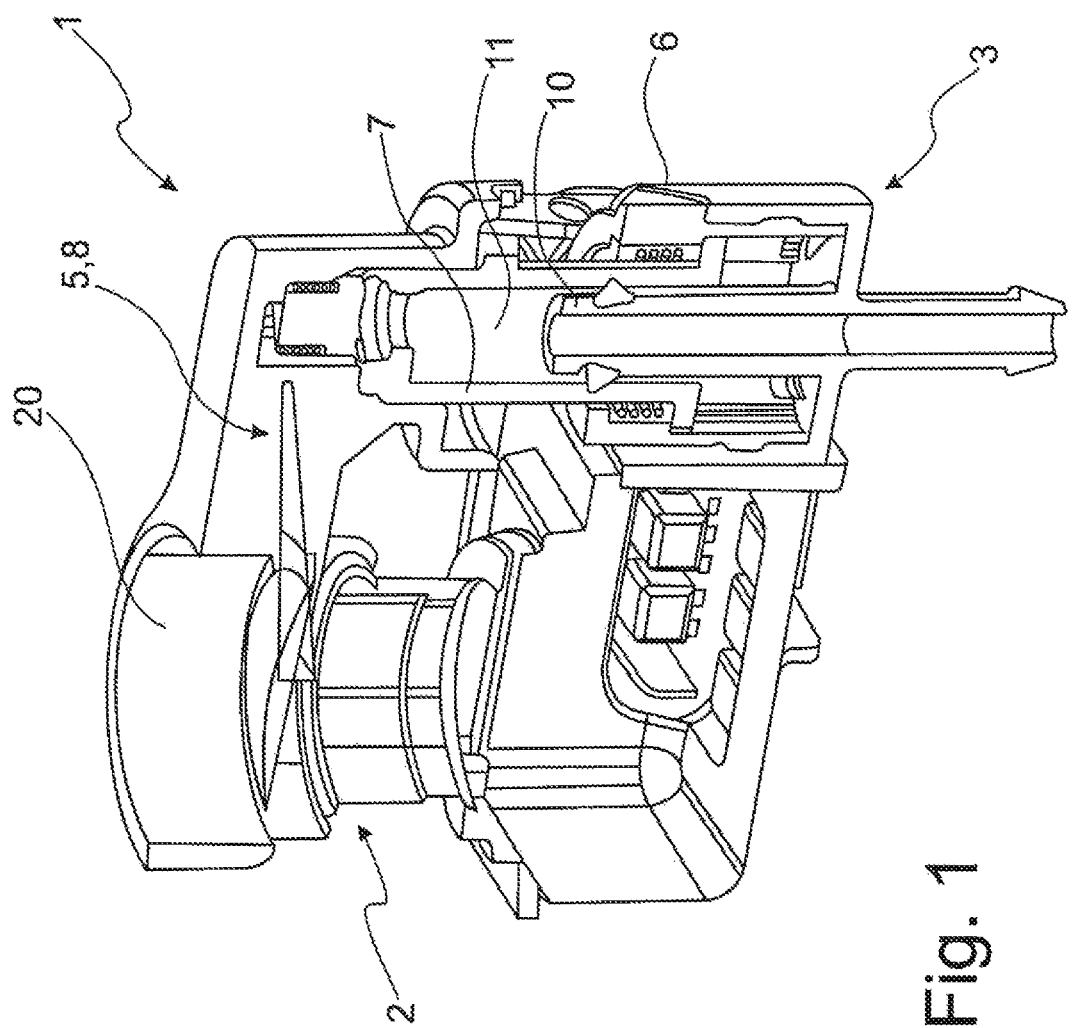
FIG. 1 shows a perspective view of an integrated on-board vehicle vision and cleaning device comprising a vehicle surface cleaning device according to the invention.

FIG. 1 shows a partial sectional view of an integrated on-board vehicle vision and cleaning system 1 comprising a rearview camera 2 as the vision system and a washing unit 3 with an extendable and retractable nozzle 5 as a vehicle surface cleaning device in the sense of the current invention. The integrated on-board vehicle vision and cleaning system 1 according to the embodiment of FIG. 1 is designed as a module which can be plugged into an opening in the bodywork 4 of the vehicle, for example which can be plugged into an opening in the bumper of a vehicle.

Figure 2:
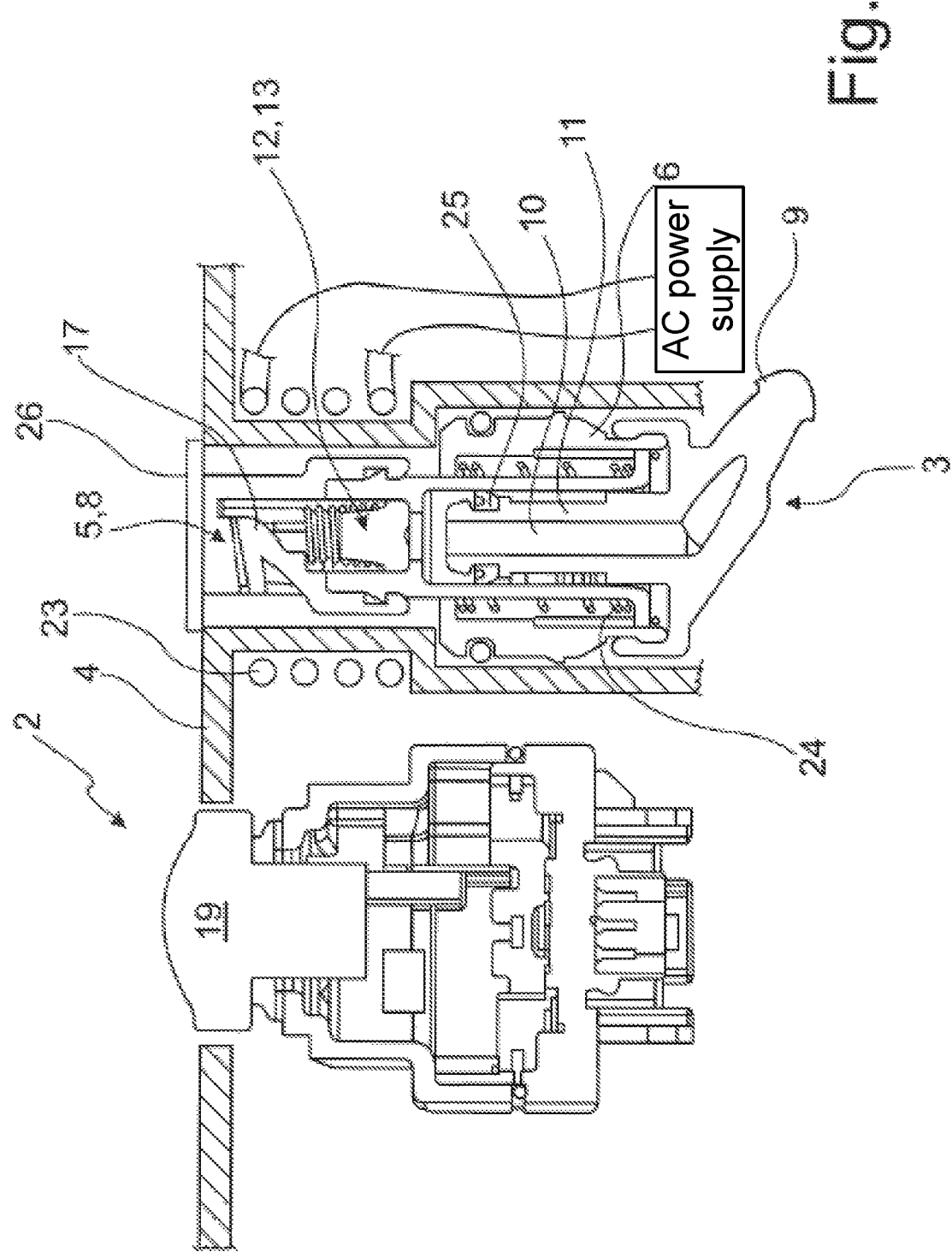
FIG. 2 shows a sectional view of a vehicle surface cleaning device in the rest position and arranged next to an on-board camera.

FIG. 2 shows a similar arrangement including a vision system and a vehicle surface cleaning system 1 in the form of a washing unit 3 with an extendable and retractable nozzle 5 where the vision system in the form of a rearview camera 2 and the washing unit 3 are arranged next to each other in the bodywork 4 of a vehicle.

The washing unit 3 comprises a nozzle carrier housing 6 in which an extendable and retractable piston 7 is slidably arranged. On the piston 7, there is arranged a nozzle carrier 8 comprising at least one nozzle 5. The nozzle carrier housing 6 is provided with one fitting 9 to which a cleaning fluid conduit which is not shown in the drawings may be connected. A cleaning system according to the current invention would normally also comprise a cleaning fluid source, for example a cleaning fluid container, and a cleaning fluid pump as well as a cleaning fluid circuit or a cleaning fluid conduit.

Via the cleaning fluid conduit connected to the fitting 9 a cleaning fluid pressurized by the cleaning fluid pump will be provided.

The piston 7 is slidably guided within the nozzle carrier housing 6 on a cleaning fluid supply tube 10 which fits into the cylindrical hollow space 11 of the piston 7. The piston 7 is held in the retracted position by the force of a spring 24. The cleaning fluid supply tube 10 is sealed against the interior peripheral surface of the piston 7 by a sealing element 25. The cleaning fluid supply to 10 opens into the hollow space 11 of the piston 7 so that the cleaning fluid provided will enter the hollow space 11 of the piston 7 and will force the piston 7 to be extended out of the nozzle carrier housing 6 by virtue of the pressure of the cleaning fluid acting on an interior end face of the piston 7 acting against the biasing force of the spring 24.

Figure 3:
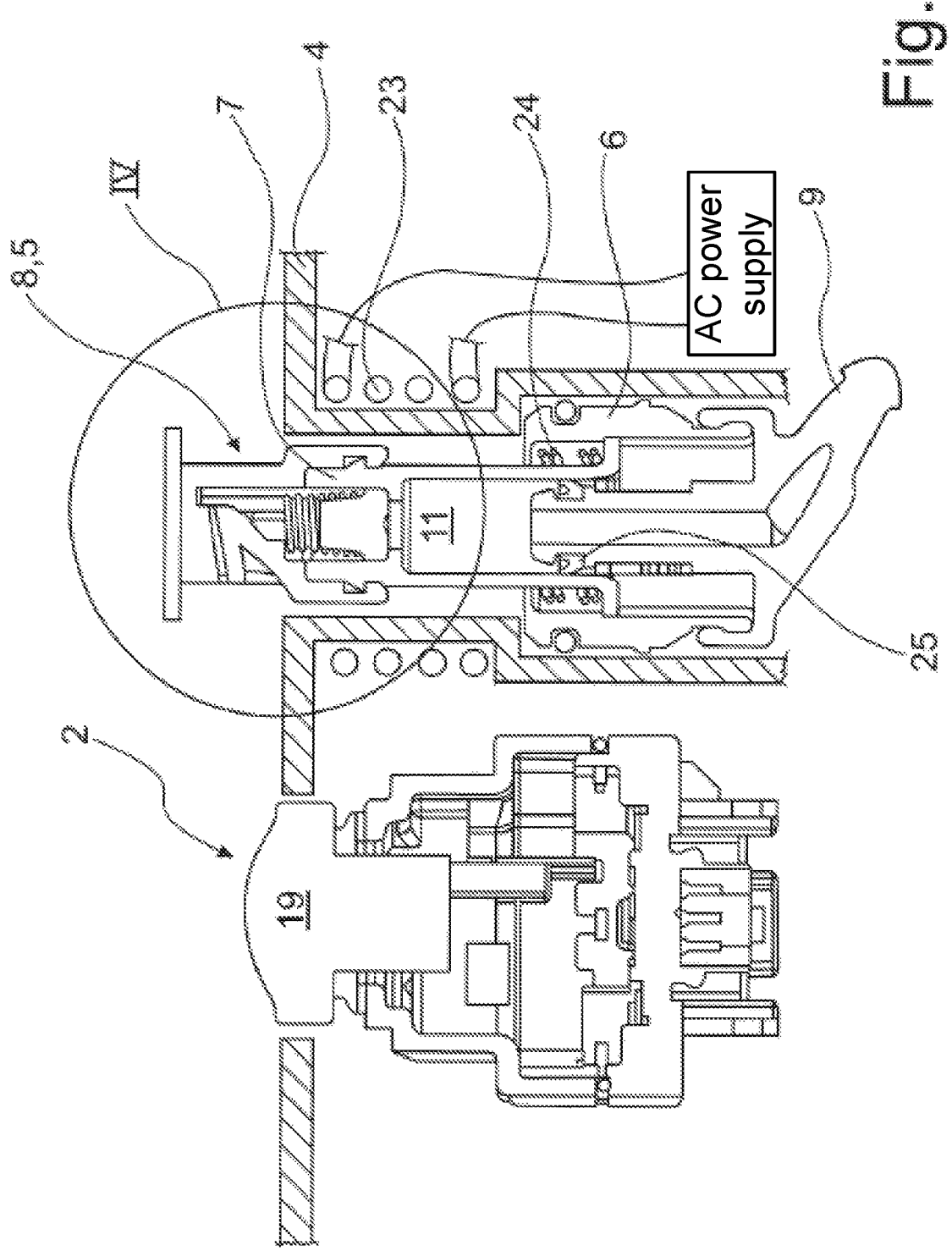
FIG. 3 shows a sectional view according to that of FIG. 2 where the vehicle surface cleaning device is in the cleaning position.
Figure 4:
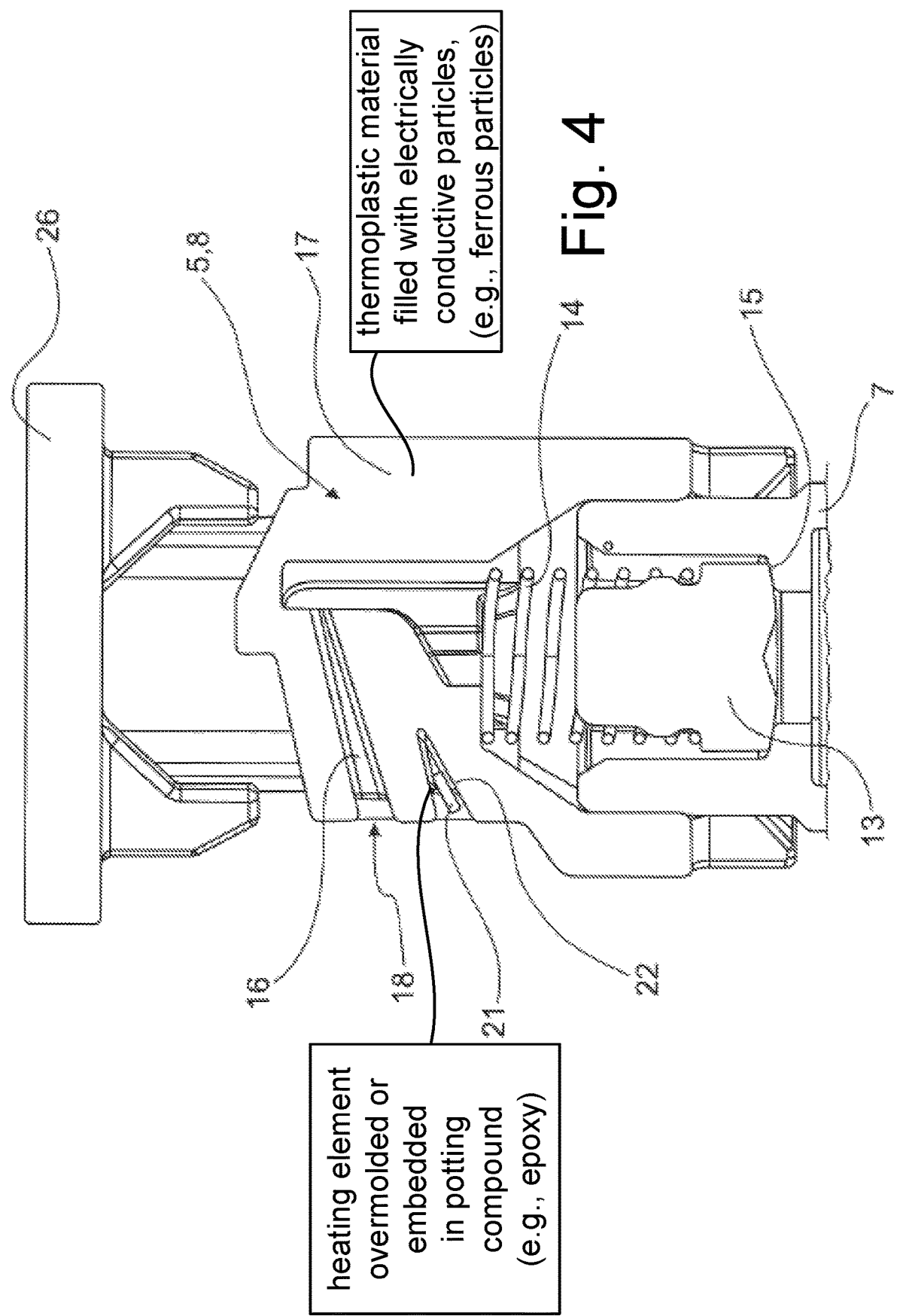
FIG. 4 shows an enlarged view of the detail IV in FIG. 3.

FIG. 4 shows an enlarged view of the leading end of the piston 7 (detail IV in FIG. 3). The leading end of the piston 7 is normally closed by a spring valve 12, which will establish a communication between the hollow space 11 of the piston 7 and nozzle duct 16 if the pressure of the cleaning fluid extends a given threshold, which may be adjusted by choosing the appropriate spring. Spring valve 12 comprises a valve body 13 which is held by a coil spring 14 in a valve seat 15 in the leading end of the piston 7. When the pressure of the cleaning fluid exceeds a given threshold, the valve body 13 will be lifted off from the valve seat 15 against the biasing force of the coil spring 14. Once the valve body 13 is being lifted of the valve seat 15 washing fluid may flow into a nozzle duct 16 extending through a nozzle body 17. The nozzle body 17 forms part of a nozzle carrier 8, which is attached to the leading end of the piston 7.

The nozzle duct 16 opens into a nozzle aperture 18 through which the cleaning fluid may be ejected and propelled towards a surface to be cleaned. In the embodiment according to FIG. 1 as well as in the embodiment according to FIGS. 2 and 3 a jet of cleaning fluid may be propelled onto the surface of a dome-shaped lens 19. The dome-shaped lens 19 does form part of the rearview camera 2. In the embodiment of FIG. 1 the dome-shaped lens 19 is surrounded by a peripheral bouncing wall 20 the function of which is to prevent escape of surplus cleaning fluid.

The design of the washing unit 3 according to FIGS. 2 and 3 corresponds to the design of the washing unit 3 in FIG. 1. As FIG. 1 shows only a schematic view of the washing unit 3 not all the details are apparent from FIG. 1. Throughout the specification of the current patent application when referring to the washing unit 3 this always refers to FIG. 1 as well as to FIGS. 2 and 3.

As seen in the enlarged view of FIG. 4, in the nozzle body 17 there is provided a metal strip 21 from ferrous metal, which is arranged in a cavity 22 of the nozzle body. The metal strip 21 functions as a heating element for the nozzle body 17 in the vicinity of the nozzle aperture 18. The metal strip 21 is embedded in a potting compound, for example a potting compound which comprises epoxy resin. The metal strip 21 extends substantially in parallel to the length of the nozzle duct 16, particularly in parallel to the leg of the duct directly merging into the nozzle aperture 18.

Within the confines of the bodywork 4 of the vehicle there is arranged an electrical coil 23 connected to an AC power supply (not shown). FIG. 2 shows the nozzle carrier 8 in the retracted position in which the nozzle 5 is concealed by the bodywork 4 of the vehicle. In this position of the nozzle carrier 8 the electrical coil 23 extends around the nozzle body 17. The electrical coil 23 is arranged relatively close to the nozzle body 17 and to the metal strip 21 such that when the electrical coil is energized by an alternating current the magnetic field of the electrical coil 23 induces a magnetic field in the metal strip 21 and thus the metal strip 21 will be heated up. The heat of the metal strip 21 will be transferred by contact into the nozzle body 17 and thus will defrost the nozzle 5 in case the outside temperature falls below freezing temperature. The electrical coil 23 for example may be energized each time the vehicle ignition will be actuated and the outside air temperature is below a given threshold.

Figure 5:
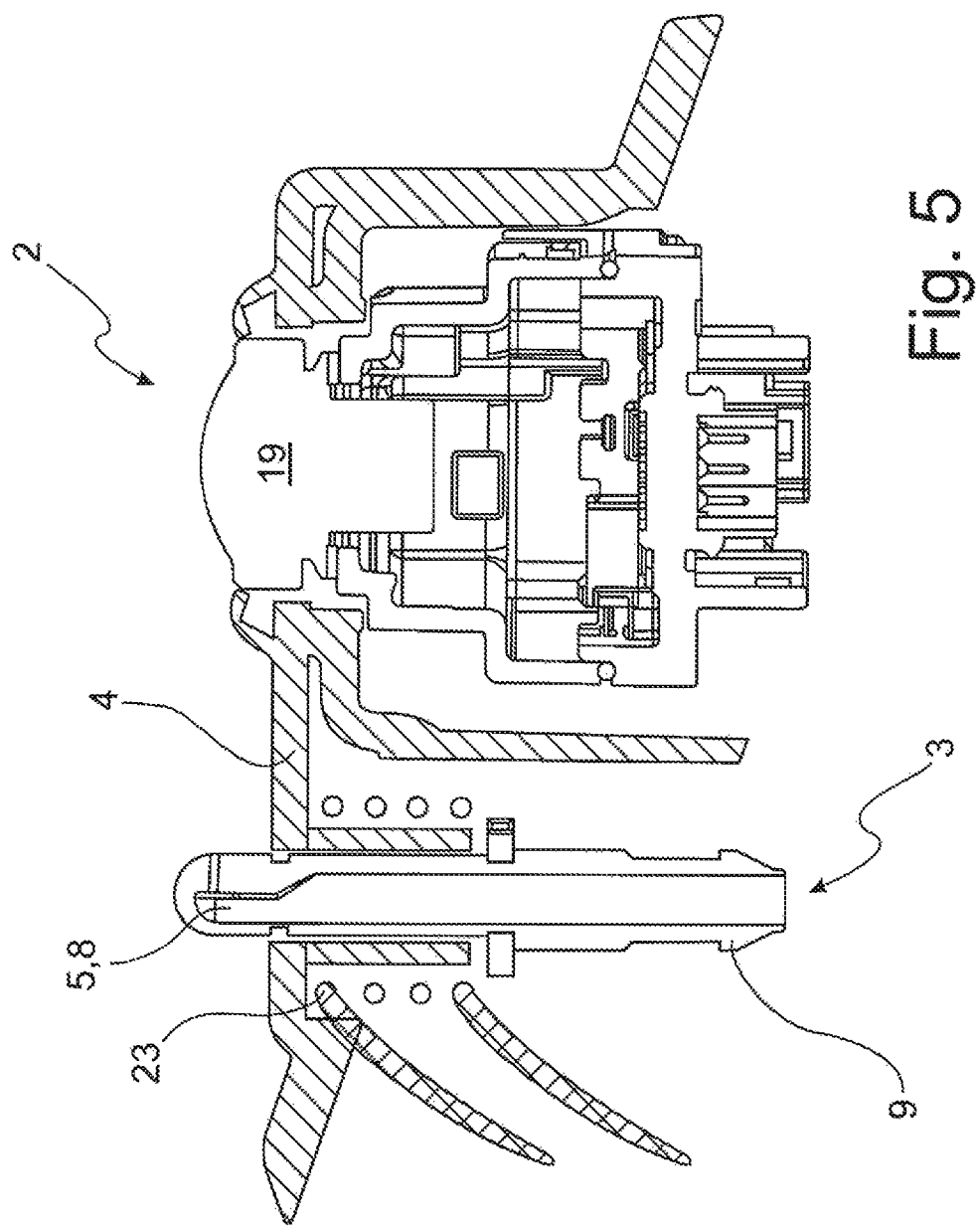
FIG. 5 shows another embodiment of a vehicle surface cleaning system with a static nozzle carrier.

Referring to FIG. 5, there is shown in other embodiment of the vehicle surface cleaning device according to the current invention. In FIG. 5 same parts as in the other embodiments have been given the same reference numerals.

FIG. 5 also shows a partial sectional view of an integrated onboard vehicle vision and cleaning system 1 comprising a rearview camera 2 as the vision system and a washing unit 3. Other than in the previously explained embodiments, the embodiment according to FIG. 5 does not comprise an extendable and retractable nozzle 5 but a static nozzle 5 instead. The washing unit 3 comprises a rather simple nozzle carrier 8 inserted into the bodywork 4 of the vehicle in a non-movable fashion. The nozzle carrier 8 is made of an electrically conductive material or comprises such electrically conductive material. For example, the nozzle carrier is made from thermoplastic material filled with electrically conductive particles, for example with ferrous metal particles. In close proximity to the nozzle carrier 8 there is arranged an electrical coil 23 completely surrounding the part of the nozzle carrier 8 which extends concealed under the bodywork 4 of the vehicle. Each time the ambient temperature falls below freezing temperature the electrical coil will be energized and thus the nozzle carrier will be heated up. A person skilled in the art will appreciate that in this embodiment the heat capacity and/or heat conductivity of the nozzle carrier 8 is sufficient to transfer the induced to the nozzle 5 so that freezing of the nozzle 5 is prevented.

REFERENCE NUMERALS

1 integrated on-board vehicle vision and cleaning system
2 rearview camera
3 washing unit
4 bodywork of the vehicle
5 nozzle
6 nozzle carrier housing
7 piston
8 nozzle carrier
9 cleaning fluid conduit
10 cleaning fluid supply tube
11 hollow space
12 spring valve
13 valve body
14 coil spring
15 valve seat
16 nozzle duct
17 nozzle body
18 nozzle aperture
19 dome-shaped lens
20 bouncing wall
21 metal strip
22 cavity
23 electrical coil
24 spring
25 sealing element
26 nozzle cover

What is claimed is:
1. A vehicle surface cleaning device comprising:
a vehicle integrated housing, including a nozzle carrier, the nozzle carrier being provided with at least one fluid nozzle,
wherein the at least one fluid nozzle has a nozzle body comprising an electrically conductive material which is at least one of in contact with the nozzle body or integrated into the nozzle body,
and
at least one electrical coil which is selectively energizable with alternating current power from an alternating current power supply,
wherein, when energized with the alternating current power, the electrical coil operates as an induction heater to induction heat the electrically conductive material and defrost the fluid nozzle, and
wherein at least one of
the electrical coil is positioned around the nozzle body when the nozzle body is in a retracted position, or
the electrical coil is integrated into or wound around a nozzle carrier housing of the nozzle carrier, or
the electrical coil is arranged in bodywork of the vehicle, and
wherein the nozzle body comprises a thermoplastic material which is filled with the electrically conductive material, wherein the electrically conductive material comprises ferrous particles.

2. The vehicle surface cleaning device according to claim 1, wherein the nozzle body includes an electrically conductive heating element.

3. The vehicle surface cleaning device according to claim 2, wherein the electrically conductive heating element is at least one of overmolded or embedded in a potting compound.

4. The vehicle surface cleaning device according to claim 2, wherein the heating element is in a form of a metal strip extending in parallel to a nozzle duct leading into a nozzle aperture.

5. The vehicle surface cleaning device according to claim 3, wherein the potting compound comprises epoxy resin.

6. The vehicle surface cleaning device according to claim 1, wherein the nozzle carrier is extendable from and retractable into the bodywork of a vehicle.

7. The vehicle surface cleaning device according to claim 1, wherein the nozzle carrier is connectable to a cleaning fluid source.

8. The vehicle surface cleaning device according to claim 1, wherein the nozzle carrier comprises at least one extendable and retractable piston which is slidably arranged within the nozzle carrier housing and which is extendable by virtue of the pressure of the cleaning fluid.

9. The vehicle surface cleaning device according to claim 7, wherein the electrical coil is arranged in or at a support for the nozzle carrier housing or in a casing for the cleaning device.

10. The vehicle surface cleaning system according to claim 1, comprising a casing to be mounted in the vehicle bodywork, a cleaning fluid source, a cleaning fluid pump and a cleaning fluid circuit or a cleaning fluid conduit.

11. The vehicle surface cleaning device according to claim 2, wherein the electrically conductive heating element comprises a steel heating element.

12. The vehicle surface cleaning device according to claim 1, wherein the at least one of the electrical coil is positioned around the nozzle body when the nozzle body is in a retracted position, or the electrical coil is integrated into or wound around a nozzle carrier housing of the nozzle carrier, or the electrical coil is arranged in bodywork of the vehicle further comprises:

the electrical coil positioned around the nozzle body when the nozzle body is in a retracted position.

13. The vehicle surface cleaning device according to claim 1, wherein the at least one of the electrical coil is positioned around the nozzle body when the nozzle body is in a retracted position, or the electrical coil is integrated into or wound around a nozzle carrier housing of the nozzle carrier, or the electrical coil is arranged in bodywork of the vehicle further comprises:

the electrical coil integrated into or wound around a nozzle carrier housing of the nozzle carrier.

14. The vehicle surface cleaning device according to claim 1, wherein the at least one of the electrical coil is positioned around the nozzle body when the nozzle body is in a retracted position, or the electrical coil is integrated into or wound around a nozzle carrier housing of the nozzle carrier, or the electrical coil is arranged in bodywork of the vehicle further comprises:

the electrical coil arranged in the bodywork of the vehicle.

* * * * *